UNITED STATES PATENT OFFICE.

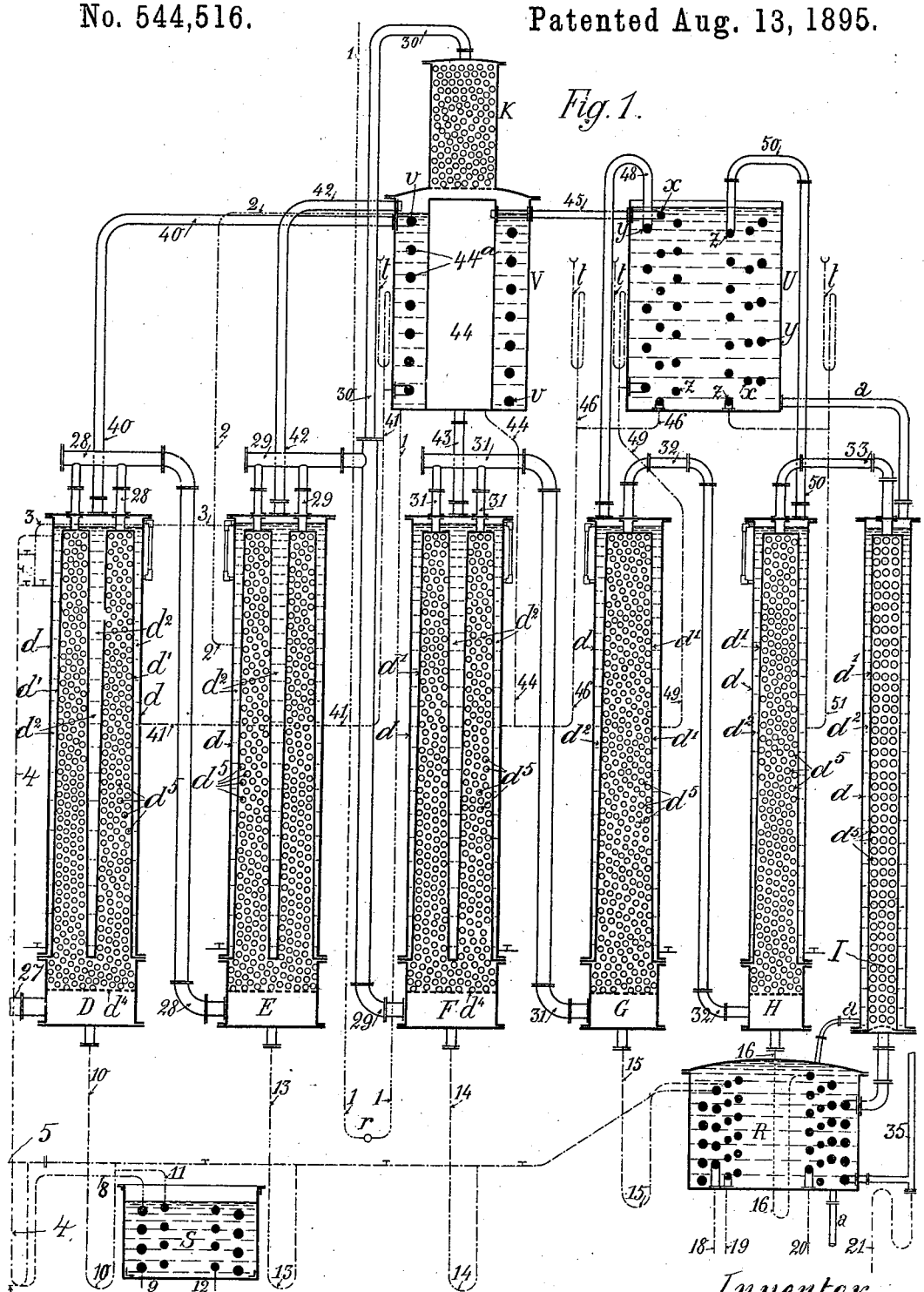

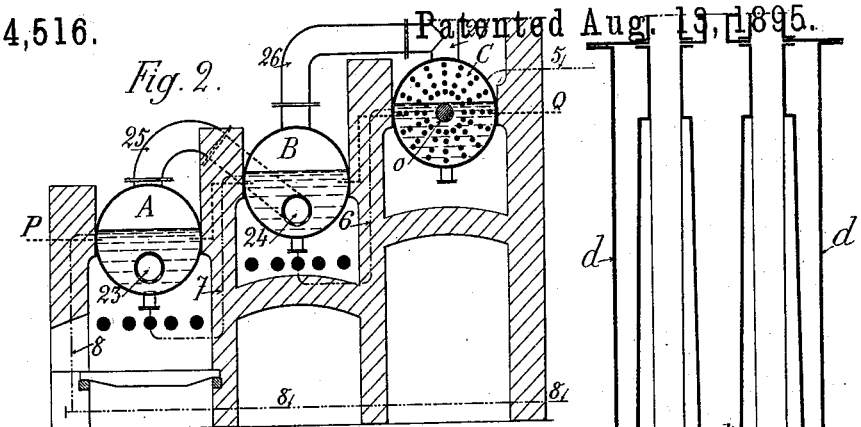
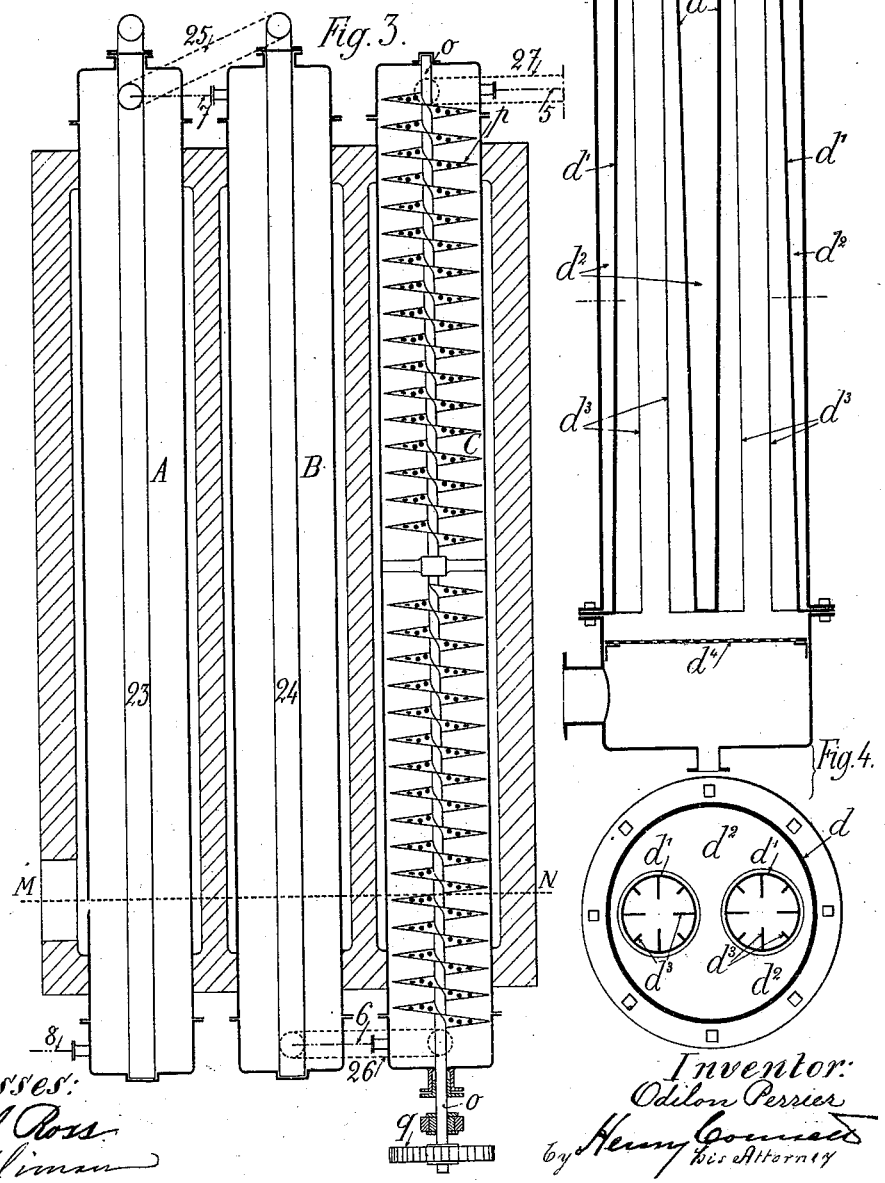

ODILON PERRIER, OF PARIS, FRANCE.

METHOD OF AND APPARATUS FOR CONTINUOUS DISTILLATION OF CRUDE HYDROCARBONS, &c.

SPECIFICATION forming part of Letters Patent No. 544,516, dated August 13, 1895.

Application filed April 24, 1894. Serial No. 508,790. (No model.)

*To all whom it may concern:*

Be it known that I, ODILON PERRIER, a citizen of the Republic of France, residing at Paris, France, have invented certain Improvements in Methods of and Apparatuses for the Continuous Distillation of Crude Hydrocarbons, such as those derived from petroleum, tars, resins, &c., of which the following is a specification.

This invention relates to the distillation of hydrocarbons; and the object of the present invention is, in part, the distillation and rectification, in one operation carried on continuously and automatically, of the various crude hydrocarbons, such process or method permitting of avoiding the fractional distillation and rectification which is effected ordinarily by successive heatings and intermitted workings.

The invention consists also in a special apparatus, to be hereinafter described, for carrying out my novel method of distillation.

My method of fractionating consists in effecting the progressive condensation of the vapors in successive analyzers which have these characteristics: First, they divide to infinity the current of vapors, as well as that of the condensed liquids, in such a manner that these two fluid-currents, reduced to a molecular state and obliged to travel in inverse methodical paths, are exposed the one to the other in direct contacts multiplied infinitely; second, they assign to each molecule of vapor a temperature which is uniform and automatically maintained invariable in each analyzer.

For dividing the fluids I employ ordinary distilling-plates, or, by preference, bits or pieces of glass, porcelain, or the like, in the form of beads or pearls, which I will hereinafter refer to as "beads." Any substance that is not porous or absorbent and which will not be attacked by the fluid treated and which is made into bead-like particles having convex surfaces will serve. I prefer beads of porcelain. The vapors and liquids which pass in opposite directions through the interstices of the mass of beads are divided to infinity, and the direct contact and movement resulting from the continuous changes of direction which these fluids necessarily undergo effect certain molecular condensations or "analyses," which are the more precise where the surfaces of contact are very considerable.

To obtain in each analyzer a temperature which shall be uniform and be automatically maintained invariable, I apply the following law of physics: Any liquid in ebullition remains at a uniform temperature so long as its composition and the tension or ambient pressure remain constant, this rule holding good whatever may be the variations which take place unexpectedly in the intensity of the heat of the furnace. In applying this law I compose the baths with which the analyzers are heated of liquids which boil at temperatures which I fix for each analyzer. This boiling-point being once determined the temperature of the bath will remain invariable, and be so maintained automatically during the entire process of distillation. The baths are arranged about the respective analyzers filled with beads in such a manner that the hydrocarbon vapors, which are obliged to pass through the analyzers successively, are subjected as they flow through the successive analyzers to progressively-decreasing temperatures, the temperature in each, however, being invariable. The result of this treatment is that each molecule of vapor before it passes from one analyzer to that next in succession is subjected to a single temperature assigned to that particular analyzer by its bath of invariable temperature. More than this, each molecule or particle is spread or flattened and exposed to the same conditions of contact as its products of condensation, which expend on them their solvent power. The work of analysis is carried on automatically and in an indefinitely continuous manner in each analyzer, whatever may be the variations of composition produced in the current of vapor, which fact permits me to classify invariably all of the volatile products and to draw off and filter them in a continuous manner.

In following this method it will be necessary to remember that any excessive increase of temperature above that of the point of ebullition of each fractional product tends to decomposition; also, it is most suitable to raise the temperature of the distillate slowly and progressively and to facilitate the disengagement of the more volatile products retained in the mass according to their solvent power.

I favor, by agitation of the liquids, the disengagement of the vapors, and I facilitate the evaporation—that is to say, the production of vapors at a low temperature—without awaiting the vaporization which provokes ebullition at a more elevated temperature, either by stirring in order to disengage the less delicate products, or, preferably, by mechanical agitation of the liquid and its exposition in thin flowing sheets or jets to contact with the vapors in order to avoid all superelevation of temperature and of pressure when products of a high grade are in question.

The apparatus I prefer to employ in carrying out the process above set forth is illustrated in the accompanying drawings, wherein—

Figure 1 is a somewhat diagrammatic sectional elevation of the apparatus as a whole. Fig. 2 is a transverse vertical section of the battery of boilers, the section being taken in the plane indicated by line M N in Fig. 3; and Fig. 3 is a horizontal section of the same, taken in the plane indicated by the line P Q in Fig. 2. Fig. 4 represents on a larger scale one of the analyzers detached, the figure including a longitudinal vertical mid-section and a transverse horizontal section taken about midway of the length of the analyzer.

A, B, and C, Figs. 2 and 3, represent a battery of three boilers arranged at different levels, the lower boiler A being heated directly by a furnace under it and the other two by the products of combustion from such furnace.

D, E, F, G, H, and I, Figs. 1 and 4, represent the analyzers, which are all, except as hereinafter explained, constructed on the same principle, but which are here represented as having structurally different forms merely to illustrate modifications. Each analyzer consists, essentially, of an outer shell $d$, which may be an elongated cylinder, and an inner casing or receptacle $d'$, which contains the beads $d^5$ before mentioned. The casing $d'$ has a perforated or foraminous bottom $d^4$, on which the beads rest, and in the analyzers D, E, and F such casing is represented as forked or double, the crotch extending down nearly to the base. In Fig. 4 radial flanges $d^3$ are represented in the branches of the casing $d'$. The space $d^2$ within the shell $d$ and about the casing $d'$ is a chamber destined to receive a liquid of which the determined boiling-point is invariable and which constitutes what I call the "bath."

U and V (seen above in Fig. 1) are condensers, and R and S (seen below in Fig. 1) are refrigerators or coolers.

In the drawings the various pipes are designated by reference-numerals to more clearly distinguish them, and the pipes through which the liquids flow are represented merely by a single broken line in order that they may be more readily distinguished from those through which the vapors flow. As these are merely common pipes or tubes it will suffice to indicate them in this manner.

The operation will be best understood by following first the movements of the liquids and then the movements of the vapors through the several parts of the apparatus.

The hydrocarbon to be distilled is introduced through a pipe 1, Fig. 1, of U shape, furnished with a controlling-cock $r$. This pipe leads the hydrocarbon to the condenser V, wherein are arranged a central chamber 44 and a coil $44^a$, through which flow heated vapors. By exchange of calories between the vapor and the liquid hydrocarbon the temperature of the latter is gradually and progressively elevated and the more volatile products therein are liberated and flow through a special bead-filled analyzer K above the condenser V. The hotter hydrocarbon, which is at the top, flows by a pipe 2 down into the space $d^2$ of the analyzer E. It there receives an additional increment of heat and passes, by way of the pipes 3, 4, and 5, into the battery of boilers C B A, Figs. 2 and 3, entering first the boiler C, as seen at the right-hand upper corner in Figs. 2 and 3. From the boiler C it flows into boiler B through a pipe 6, and from B into A by a pipe 7. It is gradually brought into contact with surfaces and vapors more and more highly heated, and finally passes off by pipes 8 and 9 in the form of tar. Pipe 9 is the coil in the cooler or refrigerator S of Fig. 1. The distillation is effected in the horizontally-arranged boilers, (seen in Figs. 2 and 3,) heated as before stated. Any number of boilers so arranged may be employed.

To avoid superelevation of the temperature and the dissociation or breaking up of the crude petroleum, and for the recovery intact of the major part of the divers products of which it is composed, I combine the heating over a naked fire with a current of superheated steam. This steam is introduced directly into the liquid mass in the boiler A by a perforated pipe 23, Figs. 2 and 3, and is projected, mainly downward, into the heart of the liquid. It stirs the liquid, regulates the temperature thereof, and carries out with it the volatile products. The mixture of steam and hydrocarbon vapors disengaged flow off through a pipe 25 and enter a perforated pipe 24 (like pipe 23) in the boiler B. Herein the hot vapors produce the same results as in the boiler A, finally flowing off through a pipe 26 to the boiler C. The liquid in the boiler C is agitated or stirred by a series of spirally-arranged perforated paddles or blades $p$, Fig. 3, mounted on a rotating shaft $o$, having bearings at the ends of the boiler and driven through a wheel $q$ on the shaft by any suitable driving-motor. The partly-submerged blades $p$ agitate the liquid and carry it up in thin sheets on their surfaces, where it is exposed to the vapors circulating in the upper part of the boiler. This device and operation produce an extensive and rapid evaporation and disengagement of the more volatile products of the liquid, and the vapors produced in boiler C may then be subjected to the work of analysis, according to density to which they will be exposed.

Having explained the movements of the liquids, I will now explain the movements of the vapors.

The vapors which leave the battery of boilers by the pipe 27 are directed to the lower part of the first analyzer D, Fig. 1, entering the same below the perforated bottom $d^4$ therein and flowing upward through the interstices between the beads $d^5$ in the casing $d'$. In their upward flow the vapors are subjected to regulation of temperature from the condensing-bath $d^2$ within the shell $d$ of this analyzer and to the condensed liquids which they encounter during their ascent, and under this double influence the temperature falls to 280° centigrade, (536° Fahrenheit.) The vapors of kerosene and those of other products still more volatile will not find at this high temperature the refrigerating conditions necessary to cause them to lose their latent heat of vaporization. They will remain in a state of vapor and flow out by the pipes 28 and down to the bottom of the next analyzer E, while the less volatile oleonaphthas which are condensed in D will be led off by the pipes 10 and 11 to coils in the refrigerator S and finally drawn off at 12, as seen in Fig. 1. The analyzers D and E differ from the others in that the bath in these consists of a continually-flowing body of oil, while in the others it is a liquid of known and invariable boiling-point. The temperature, composition, and quantity of said liquid are maintained by continually returning to the bath the portions which have been volatilized and subsequently condensed. In their travel the vapors pass through the analyzers E and F, the vapors abandoning the limpid oil according to the degree of temperature of the bath $d^2$ of the particular analyzer. The pipe 13 takes the condensed liquid from the analyzer E and the pipe 14 from the analyzer F. The bath in the analyzer F reduces the temperature of the vapors which pass out of it to 150° centigrade (302° Fahrenheit) invariably. The limpid oil flowing from the analyzers E and F is kerosene, and it is cooled in the refrigerator R, from which it is drawn by a pipe 18. The vapors which pass off from the analyzer F flow by the pipes 31 to the analyzer G, wherein they are reduced from a temperature of 150° to 110° centigrade, (230° Fahrenheit,) which serves to condense to a liquid state the essence of petroleum. This liquid flows off by a pipe 15 to a coil in the refrigerator R, from which it is drawn by a pipe 19. The next analyzer H reduces the temperature of the vapors flowing to it by way of pipe 32 from 110° to 90° centigrade, (194° Fahrenheit,) which serves to condense to a liquid form the benzines. These flow by a pipe 16 to a coil in the refrigerator R and are drawn off by a pipe 20. Finally the vapors from the analyzer H pass by a pipe 33 to the top of the analyzer I and down through this analyzer to the bottom thereof. From this the product of condensation—gasoline—passes through a coil in the refrigerator R, whence it is recovered by a pendent trapped pipe 21, while the gases not condensed pass into the atmosphere by the pipe 35 or are recovered and utilized for heating or lighting.

The vapors given off from the baths of the respective analyzers F, G, H, and I are separately condensed in coils $v$, $x$, $y$, and $z$, or the like, arranged in the condensing-tanks U and V, and they are immediately returned in a liquid form to their respective baths in order that the composition of the respective baths, once established, may not be modified or changed. The bath-vapors flow to their respective condensing-coils or the like from the respective analyzers D, F, G, and H by way of pipes 40, 43, 48, and 50, and the condensed liquid is returned by pipes 41, 44, 49, and 51. A safety-trap $t$ is provided for each condensing-coil $v$, $x$, $y$, and $z$. These traps serve for the evacuation of air at the beginning of each distillation and for interposing afterward a column of mercury of invariable height, which insures in each bath the maintenance of a constant pressure, whereby the invariability of the boiling-point in the several baths is assured.

All of the analyzers are substantially alike in their connections, except the analyzer E, which is also a heater designed to utilize to the utmost extent the heat of the vapors for raising the temperature of the petroleum. In this particular analyzer the bath is produced by the petroleum already raised to a high temperature in the condenser V, and the vapors which it gives off, passing through the pipe 42, enter the upper part of the condenser V, where their temperature is made uniform in K with that of the vapors disengaged in V. The mixture is directed by the pipes 30 and 29 into the analyzer F, where it is subjected to the common law governing fractionating without its having been subjected to dissociation due to overheating.

The analyzers might be placed in a horizontal instead of an upright position, but the latter position is preferred. The number of analyzers required and the temperature of their respective baths will depend solely on the number and nature of the fractional products to be obtained and the character of the particular liquid to be distilled.

Having thus described my invention, I claim—

1. The herein described method of distilling crude, liquid hydrocarbons in a continuous manner, for the purpose of facilitating the disengagment of the more volatile products at a comparatively low temperature, which consists in subjecting an inclosed current of the liquid, at one point in its flow, to agitation at a comparatively low temperature, in such a manner as to expose the liquid in thin films, then exposing the liquid, at a farther point in its flow to heat sufficient to vaporize it, and finally leading the hot vapors so generated back to the point where the agitation is proceeding, substantially as set forth.

2. In an apparatus for the continuous distillation of crude hydrocarbons, the combination with a boiler C, through which the liquid hydrocarbon flows, and with a rotating agitator, contained in said boiler C, said agitator consisting of a shaft with a series of spirally arranged, perforated blades, of the boilers A and B, connected together and with the boiler C, and means for heating said boilers A and B, whereby the hot hydrocarbon vapors from the boilers A and B, are caused to act on the vapors generated at a lower temperature in the boiler C and on the thin film of liquid on the blades of the agitator therein.

3. In an apparatus for the fractional distillation of crude hydrocarbons, the combination with the boiler A, provided with a perforated pipe 23 adapted to receive superheated gases, the boiler B, arranged at a higher level than boiler A and provided with a perforated pipe 24, the pipe 25 connecting the boiler A with the pipe 24, the boiler C, arranged at a higher level than boiler B, and provided with a rotating agitator and an outlet for vapors, the pipe 26, connecting the upper parts of the boilers B and C, and the connecting pipes 5, 6 and 7, substantially as set forth.

In witness whereof I have hereunto signed my name in the presence of two subscribing witnesses.

ODILON PERRIER.

Witnesses:
PAUL MAULVAULT,
ALBERT MAULVAULT.